F. Moore,
Automatic Fan.
N° 30,492. Patented Oct. 23, 1860.
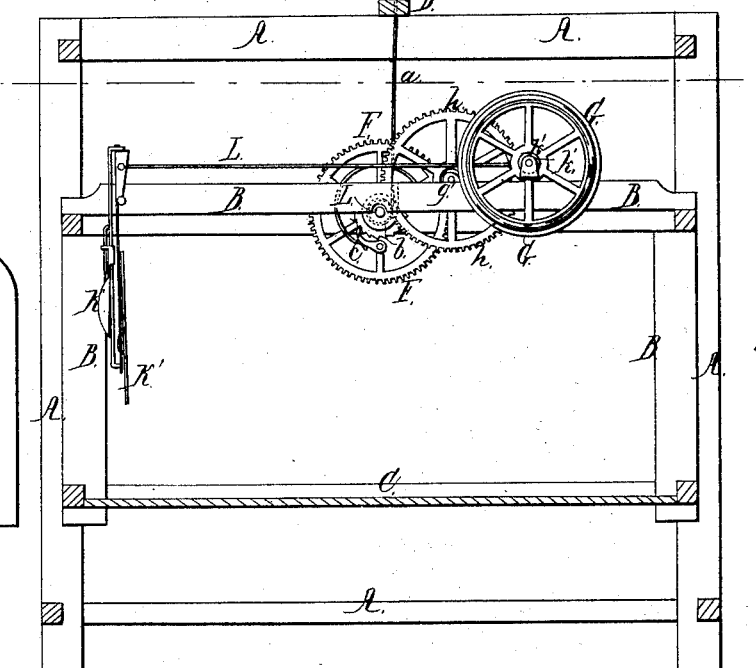
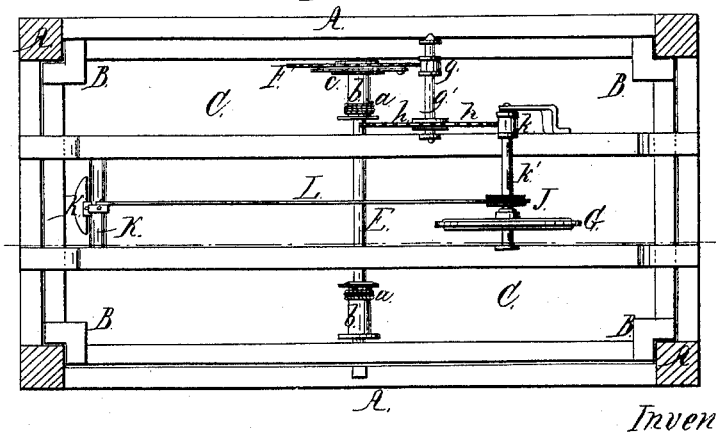
Witnesses:
J. W. Coombs
R. S. Spence
Inventor:
F. Moore
per Munn & Co
Attorneys

UNITED STATES PATENT OFFICE.

F. MOORE, OF PANOLA, MISSISSIPPI.

FAN VENTILATING BEDSTEAD.

Specification of Letters Patent No. 30,492, dated October 23, 1860.

*To all whom it may concern:*

Be it known that I, F. MOORE, of Panola, in the county of Panola and State of Mississippi, have invented a new and Improved Fanning-Bedstead; and I do hereby declare that the following is a full, clear, and exact description thereof, reference being had to the accompanying drawings, making part of this specification, in which—

Figure 1 is a vertical longitudinal section taken through a bedstead with my improvement applied to it. Fig. 2 is a top view of the bedstead of Fig. 1. Fig. 3 is a detached view of the pendulum and fan.

This invention is as the title implies an improvement in bedsteads whereby a fan is kept in motion for any desirable length of time, which will fan the sleeper and keep flies and mosquitos away.

To enable those skilled in the art to fully understand my invention I will proceed to describe its construction and operation.

In the drawings, A is the bedstead composed of four posts of any suitable height, with longitudinal and transverse brace rails secured at the top and bottom of the posts. B is a movable frame that works up and down within the bedstead frame A. The bottom C, of the frame B, may be made of slats or springs, or a sacking may be used in the usual manner, and on this the bed is made.

D is a cross bar from which the frame B, is hung by cords $a$, $a$, which cords are attached to flanged drums $b$, $b$, on a shaft E, that has its bearings in the top of frame B, about the middle of its length; on one end of this shaft E, is placed a large spur wheel F, which engages with the shaft E, by a ratchet and pawl $c$. The wheel F, engages with a small pinion wheel $g$, which carries on its shaft $g'$, a large spur wheel $h$, and this spur wheel engages with a pinion $k$, that carries on its shaft $k'$, a fly wheel G, and an eccentric wheel J.

K is a pendulum hung from one end of the frame B, with a fan K', applied to it. The pendulum with the fan are vibrated by a connecting rod L, connecting from the pendulum rod to the eccentric wheel J, on shaft $k'$.

One end of shaft E, projects from the frame B, and is made so as to receive a key, by which the cords $a$, $a$, may be wound up on drums $b$, $b$, the wheel F, remaining stationary while the cords and consequently the bed frame B, are wound up. The frame B, is not made heavy enough to operate the wheel work, but on placing a weight, say one or two persons in the bed their weight will set the train of wheel work in motion and the frame will descend slowly to the bottom of the bedstead posts. It is intended to multiply the wheel work so that the descent of the frame B, two or three feet will require several hours or as long a time as may be desirable. When the frame B, has run down it may be wound up again with a crank key ready for use.

Having thus described my invention, what I now claim as new and desire to secure by Letters Patent is—

The arrangement of the pendulum fan K K, rod L, gearing G, $h$, F and arms $b$, and cords $a$, with the bar D bed frame B, and bedstead A as and for the purposes herein shown and described.

F. MOORE.

Witnesses:
JAMES BOWERS,
M. D. KEITH.